(12) United States Patent
Landwehr (10) Patent No.: US 7,837,406 B2
(45) Date of Patent: Nov. 23, 2010

(54) SHRINK DISC UNIT AND TOOL FOR ASSEMBLY THEREOF

(75) Inventor: Wilhelm Landwehr, Gdingener Str. 9, Wilhelmshaven (DE) 26388

(73) Assignee: Wilhelm Landwehr, Wilhelmshaven (DE)

( * ) Notice: Subject to any disclaimer, the term of this patent is extended or adjusted under 35 U.S.C. 154(b) by 556 days.

(21) Appl. No.: 10/587,923

(22) PCT Filed: Dec. 21, 2004

(86) PCT No.: PCT/EP2004/014553

§ 371 (c)(1),
(2), (4) Date: Sep. 6, 2007

(87) PCT Pub. No.: WO2005/073576

PCT Pub. Date: Aug. 11, 2005

(65) Prior Publication Data

US 2008/0138148 A1    Jun. 12, 2008

(30) Foreign Application Priority Data

Feb. 2, 2004    (DE)    ................... 20 2004 001 530 U (51) Int. Cl.
*F16D 1/09*    (2006.01)
*F16L 17/00*    (2006.01)
(52) U.S. Cl. .................. 403/31; 403/15; 403/37
(58) Field of Classification Search .................. 403/15, 403/31, 32, 36–40, 273
See application file for complete search history.

(56) References Cited

U.S. PATENT DOCUMENTS

| | | | | |
|---|---|---|---|---|
| 3,033,597 A | * | 5/1962 | Miller | .......................... 403/15 |
| 3,772,759 A | * | 11/1973 | Bunyan | .......................... 29/252 |
| 4,425,050 A | * | 1/1984 | Durand | .......................... 403/15 |
| 4,616,948 A | | 10/1986 | Jelfs | |
| 4,702,635 A | | 10/1987 | Muellenberg | |
| 4,925,415 A | * | 5/1990 | Sutcliffe | .......................... 440/83 |
| 4,979,842 A | * | 12/1990 | Miller et al. | .................. 403/15 |
| 5,149,220 A | * | 9/1992 | Elsner et al. | ................... 403/5 |
| 5,156,480 A | * | 10/1992 | Elsner | ........................... 403/5 |

(Continued)

FOREIGN PATENT DOCUMENTS

DE    8411110 U1    8/1985

(Continued)

OTHER PUBLICATIONS

International Search Report dated Jun. 6, 2005, Application No. PCT/EP2004/014553.

*Primary Examiner*—Joshua T Kennedy
(74) *Attorney, Agent, or Firm*—RatnerPrestia (57) ABSTRACT

A shrink disc unit including a rotating body with a peripheral outer surface and a hub surrounding the rotating body with a peripheral inner surface. The peripheral inner surface and the peripheral outer surface form a separating line between the rotating body and the hub at an angle to a rotational axis of the rotating body. A fluid channel leads through the rotating body or the hub for pressurization of the separating line with a pressure fluid. A fixing device, formed from one of the rotating body or the hub, alone or in combination with the other, may be used to fix a tool for the assembly or disassembly of the hub at a given angular position on the rotating body and/or the hub.

47 Claims, 8 Drawing Sheets

U.S. PATENT DOCUMENTS

| | | | |
|---|---|---|---|
| 5,188,478 A * | 2/1993 | Bitsch et al. | 403/267 |
| 5,476,337 A * | 12/1995 | Mullenberg | 403/370 |
| 5,672,026 A * | 9/1997 | Disborg | 403/369 |
| 5,947,626 A * | 9/1999 | Miller et al. | 403/31 |
| 6,231,262 B1 * | 5/2001 | Whitney | 403/31 |
| 2004/0195837 A1 * | 10/2004 | Kondo et al. | 285/354 |

FOREIGN PATENT DOCUMENTS

| | | |
|---|---|---|
| DE | 8714927 U1 | 6/1988 |
| DE | 9208196 U1 | 10/1993 |
| DE | 20307136 U1 | 9/2003 |
| FR | 2707202 | 1/1995 |
| GB | 1586703 A | 3/1981 |

* cited by examiner

SHRINK DISC UNIT AND TOOL FOR ASSEMBLY THEREOF

This application is the U.S. national phase application of PCT International Application No. PCT/EP2004/014553, filed Dec. 21, 2004, which claim priority to German Patent Application No. DE 20 2004 001 530.7, filed Feb. 2, 2004.

BACKGROUND OF THE INVENTION

1. Technical Field

The invention relates to a shrinkage disc unit which can in particular serve to connect two shafts. It further relates to a tool for establishing and/or releasing an interference fit assembly formed by the shrinkage disc unit. Lastly, it relates to an assembling and/or disassembling array, i.e. a combination of the shrinkage disc unit and the tool, for establishing and/or releasing the interference fit assembly.

2. Description of the Related Art

In many applications, two shaft ends are connected, for transferring torque, by a cylindrical interference fit assembly, wherein one shaft end is embodied as a hollow cylindrical shaft, into which the other shaft end, which is generally formed as a solid cylindrical shaft, is inserted. An additional sub-assembly is placed on the cylindrical outer surface of the hollow shaft and exerts a force directed radially inwards on the hollow shaft. This force causes the cylindrical inner surface of the hollow shaft to be pressed onto the cylindrical outer surface of the solid shaft, generating a frictional lock which can transfer torques and axial forces from one shaft end to the other.

Such a shrinkage assembly is for example used in wind power plants, to connect the rotor shaft to the input shaft of the gear system. Such an assembly is also a preferred example application of the invention.

A so-called shrinkage disc is then preferably used as the sub-assembly for generating the radial pressing, wherein a thick-walled, internally conical hub is mechanically or hydraulically pushed onto a thin-walled, externally conical tensioning sleeve. A cylindrical inner surface of the tensioning sleeve sits on the cylindrical outer surface of the hollow shaft. Pushing the hub onto the tensioning sleeve exerts the radially acting force described on the hollow shaft.

The two currently most common shrinkage disc designs comprise integrated devices which make external tools for assembling and disassembling substantially superfluous. Only spanners or hydraulic pumps are needed as external tools for assembling and disassembling the shrinkage discs. The axial force for pushing the hub onto the tensioning sleeve is generated either by tensioning screws or by a hydraulic chamber.

For disassembling one design, the tensioning screws are released. The conical surface assembly between the tensioning sleeve and the hub is embodied to not be self-locking, such that the hub slips from the tensioning sleeve by itself. In the other design, a second hydraulic chamber is installed which, for disassembling, generates an axial force, pointing towards the small diameter of the cone, onto the hub. The tensioning sleeve thus pushes the hub, against the self-locking in the conical joint between the hub and the tensioning sleeve.

Integrating the devices for generating the axial force for assembling and disassembling is very complicated and therefore leads to significantly higher production costs. Given that for a plant life of for example 20 years, the assembling and disassembling process shall only be performed once or twice, the complexity of integrating these devices is economically inappropriate.

Assembling a shrinkage disc of the first design on the hollow shaft is very time-consuming, since the tensioning screws distributed in large numbers on the circumference have to be screwed tight in stages, up to the maximum assembling torque, in order to prevent the shrinkage disc from being unevenly tensioned. In addition, intervals must be inserted which are necessitated by fitting processes of the screw connections and the necessary re-tensioning. Assembling the shrinkage disc is therefore considerably time-consuming.

A shrinkage disc of the second design has a significantly larger constructional length than the cone needed for generating the radial pressing, due to the integration of the hydraulic chamber for generating the assembling force. The larger constructional length also necessitates a longer hollow shaft, in order to provide the installation space for the shrinkage disc. The mass and the moment of inertia of the plant increase, which in many applications can result in a negative effect on operations.

SUMMARY OF THE INVENTION

It is an object of the invention to provide a simple and therefore inexpensive design for an interference fit assembly, based on a shrinkage connection, for rotational bodies—referred to in the following as a shrinkage disc unit. The time needed for assembling and/or disassembling should nonetheless be short. The moment of inertia is preferably less than that of known shrinkage disc units. Another object is to prevent unimpeded axial movement between parts of the shrinkage disc unit while the shrinkage disc unit is being assembled and/or disassembled.

In accordance with the invention, the assembling axial force is applied by a separate tool which is preferably at least substantially annular and preferably divided, i.e. divided once or more than once into annular segments, and which can be detached from the shrinkage disc unit and is only fastened to the shrinkage disc unit or the hollow shaft during assembling and disassembling. Due to this configuration, it is possible to produce the shrinkage disc unit itself from comparatively simple and therefore inexpensive components. In addition, this achieves a reduction in the mass and the moment of inertia of the shaft connection.

The shrinkage disc unit comprises a hub having an axially widening circumferential inner surface which is pushed by the assembling axial force of the tool onto a circumferential outer surface of the rotational body which narrows at least substantially congruently with respect to the circumferential inner surface of the hub. The rotational body can in particular be a shaft, preferably a hollow shaft, or a tensioning sleeve arranged radially between the hub and the shaft. The circumferential surfaces form an inclined joint via which they are in frictional surface contact with each other. The circumferential surfaces, which can also be referred to as shrinkage surfaces, are preferably formed as conical surfaces.

The wedge or taper ratio of the shrinkage surfaces is preferably selected such that the friction in the joint between the surfaces achieves a self-locking against the hub axially slipping off the circumferential outer surface. In order, while assembling and disassembling the hub, to reduce or largely eliminate the axial holding forces resulting from this, the joint is preferably charged with a pressurized fluid during assembling and disassembling.

Due to the radial tensile stresses in the hub which build up during assembling as the hub body widens, the hub tends to slip in the direction of the slope of its circumferential inner surface. If the friction between the hub and the circumferential outer surface of the rotational body is reduced or eliminated by pressing pressurized fluid into the joint, there is a danger of the hub slipping off the rotational body abruptly. Due to the high kinetic energy of the hub released, this represents a great danger to the assembling staff and other parts of the plant if no additional securing elements—such as for example a shaft nut—are mounted on the rotational body in order to restrict the axial movement of the hub.

In a particularly preferred embodiment, the invention envisages the tool and the rotational body and/or hub being configured such that a pressurized fluid can only be pressed into the joint when the tool is mounted properly. This can be achieved by supplying the pressurized fluid via the tool or by separating the joint from the surroundings by sealing it off. The tool can also be configured to fulfill these two functions in combination. Further configuring the tool restricts the axial movement of the hub by itself. An axial movement of the hub on the circumferential outer surface of the rotational body is controlled by means of the tool.

The tool is connected to the rotational body, for example the tensioning sleeve or the free end of the hollow shaft, or to the hub in a positive and/or non-positive lock. A non-positive-lock connection is preferably achieved by tensile screws which are screwed into the frontal side of the tensioning sleeve, hollow shaft or hub and tighten the tool against the tensioning sleeve, hollow shaft or hub, thus securing it on the tensioning sleeve, hollow shaft or hub. A positive-lock connection is preferably achieved by a heel on a circumferential inner surface of the tool engaging with a counter heel which can in particular be formed by a radial, preferably circumferential groove in a circumferential outer surface of the rotational body or hub.

The assembling axial force is preferably applied by a number of hydraulic duty cylinders. Tensile screws, pressure screws, wedge mechanisms or lever mechanisms or combinations of these can, however, also alternatively be used.

The hub moves axially on the rotational body until the envisaged radial pressing of the interference fit assembly, preferably the pressing of a hollow shaft on a solid shaft, has been achieved. Due to the force-displacement ratios resulting over the joint, it is possible to determine the radial pressing via the shifting path of the hub or via the applied assembling forces.

The shrinkage disc unit is disassembled by shifting the hub on the rotational body in the direction of the slope of the joint and/or towards the smaller diameter of the preferably conical joint. If suitably designed, the assembling tool can also be used as a disassembling tool; alternatively, a separate disassembling tool can be used.

The self-locking of the hub against shifting on the circumferential outer surface allows an additional safeguard between the hub and the rotational body to be omitted during operations in certain applications.

In applications in which increased demands are made on the functional security of the shrinkage disc unit because of expected vibrations, the hub should be additionally axially secured on the circumferential outer surface. It is secured by means of at least one securing element which preferably establishes a positive-lock connection between the hub and the rotational body.

The hub is prevented from slipping off in an uncontrolled manner during assembling and disassembling processes, and the associated dangers are prevented, by configuring the pressure port for charging the joint—preferably hydraulically—with pressurized oil such that it can only be supplied through a counter piece which is a direct part of the tool; an autonomous port for the pressurized fluid is preferably not provided on the interference fit assembly via hydraulic screw connections or the like. Another configuration of the pressure port and the counter piece forces the tool to be properly mounted, in order to enable the pressure system of the shrinkage disc unit to be sealed off and the pressure to therefore build up. These measures ensure that if the hub slips off the rotational body in an uncontrolled manner, it is caught by the tool, such that there is no danger to persons or material.

The tool is preferably forced to be properly mounted because at least one portion of the tool and at least one counter portion of the rotational body or hub only interlock when the tool is properly mounted. Otherwise, the configuration of these portions prevents the tool from being mounted completely.

The embodiment of a shrinkage disc unit as described, in which the circumferential outer surface serving as the shrinkage surface is formed by a portion of a hollow shaft, is specifically appropriate for new constructions; by omitting a separate tensioning sleeve, the production and assembling costs, and therefore the overall costs of the plant manufacture, are reduced.

In existing plants, the shrinkage disc units used hitherto can be replaced by a shrinkage disc unit in accordance with the invention comprising a tensioning sleeve, since the port dimensions remain identical.

Preferred features of the invention are also described in the sub-claim and combinations of these. The features described in these, and those explained above, reciprocally complement each other in an advantageous way.

BRIEF DESCRIPTION OF THE DRAWINGS

The invention is explained below on the basis of example embodiments. Features explained by way of the example embodiments, each individually and in the disclosed combinations of features, advantageously develop the subjects of the claim. There is shown:

DETAILED DESCRIPTION

Figure 1:
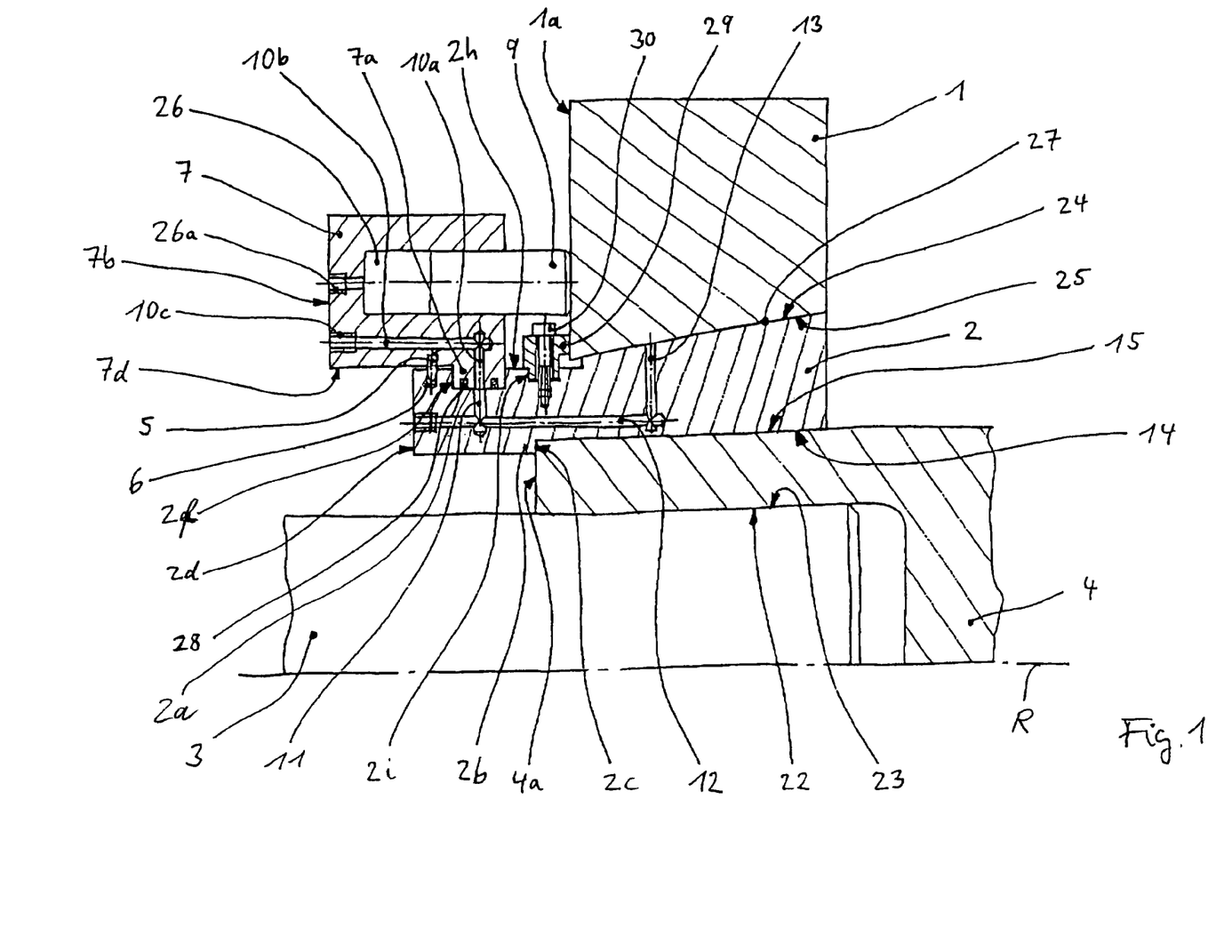
FIG. 1 a shrinkage disc unit according to a first example embodiment.

FIG. 1 shows a first example embodiment of a shrinkage disc unit as described.

A preferably cylindrical inner surface 14 of a tensioning sleeve 2 is arranged on a congruent outer surface 15 of a hollow shaft 4. A solid shaft 3 is inserted into the hollow shaft 4, wherein a preferably cylindrical inner surface 22 of the hollow shaft 4 abuts a congruent outer surface 23 of the solid shaft 3. The tensioning sleeve 2 comprises a conical outer surface 24 on which an inner surface 25 of a hub 1, provided with a congruent cone, is supported.

A fixing structure of the assembling tool, formed as an annular body 7, preferably comprises at least two radial divisions and is fastened in an annular groove 2a of the tensioning sleeve 2 in a positive lock via a stay directed radially inwards from the preferably cylindrical inner surface 7d.

The axial assembling forces are generated hydraulically and applied by a plurality of duty cylinders which consist substantially of pistons 9 and cylindrical bores 26 comprising pressure ports 26a. The cylindrical bores 26 are preferably worked directly into the annular body 7. When the cylindrical bores 26 are charged with a pressurized fluid, the pistons 9 exert an axial force on the frontal side 1a of the hub 1 facing them, axially shifting it on the tensioning sleeve 2.

The tensioning sleeve 2 preferably comprises a heel 2b having a smaller inner diameter than the cylindrical inner surface 14. When assembling the shrinkage disc unit, the tensioning sleeve 2 is pushed far enough onto the hollow shaft 4 that the frontal surface 2c of the heel 2b comes to rest on the frontal surface 4a of the free end of the hollow shaft 4. This defines the position of the tensioning sleeve 2 on the hollow shaft 4.

In order to reduce the axial assembling and disassembling forces needed, it is preferably envisaged that a pressurized fluid is supplied to the joint 27 between the conical inner surface 25 and the conical outer surface 24.

The pressurized fluid is supplied to the joint 27 via a system of bores 10a, 10b, 11, 12 and 13 which are preferably inserted directly into the annular body 7 and preferably directly into the tensioning sleeve 2. The bore 11 is preferably embodied as a blind hole and arranged such that it is orientated from the cylindrical shell surface of the annular groove 2a radially with respect to the centre axis of the tensioning sleeve 2. The bore 13, formed as a blind hole, is preferably arranged such that it points from the conical outer surface 24, substantially radially with respect to the centre axis of the tensioning sleeve 2. The bore 12, orientated substantially axially with respect to the centre axis of the tensioning sleeve 2, connects the radial bore 11 to the radial bore 13. The bore 12, embodied as a blind hole, ports onto a frontal surface 2d of the tensioning sleeve 2 and is preferably sealed off against pressurized fluid escaping on the side of the frontal surface 2d by a suitable screw connection. The bore 10a in the annular body 7 is embodied as a blind hole and is arranged in the stay 7a such that it is orientated preferably flush with the radial bore 11 when the assembling tool is properly attached. The other bore 10b is embodied in the annular body 7 as a blind hole and is arranged substantially axially with respect to the centre axis of the annular body 7. It connects a pressure port 10c on the frontal side 7b of the annular body 7 to the bore 10a. A sealing element 28 seals off the stay 7a, preferably radially, from the annular groove 2a at the point at which the pressurized fluid is conducted from the bore 10a to the bore 11. When the shrinkage disc unit has been completely assembled and the tool removed, the bore 11 is sealed with a cover against contaminants entering.

The annular body 7 is for example forced to be properly mounted on the tensioning sleeve 2 by shrinking a cylindrical trunnion 5 into the cylindrical inner surface 7d of the annular body 7, wherein when the annular body 7 is properly mounted, a preferably hemispherical end of the trunnion 5 protrudes into a radial bore 6 in a preferably cylindrical outer surface 2h of the tensioning sleeve 2. The tensioning sleeve 2 is configured such that the trunnion 5 cannot be placed anywhere except in the bore 6. It is therefore not possible to mount the annular body 7 on the tensioning sleeve 2 in a position other than the proper position. The inner diameter of the bore 6 is preferably only slightly larger than the outer diameter of the trunnion 5, such that an angular offset between the bores 10a, 11 at the transfer point, caused by assembling, is minimized.

The tensioning sleeve 2 comprises a number of radial grooves 2i on its outer surface 2h, into which securing elements 29 are inserted which are secured on the tensioning sleeve 2 with screws 30. The securing elements 29 create the positive-lock connection between the radial grooves 2i of the tensioning sleeve 2 and the frontal side 1a of the hub 1 and so secure the hub 1 against slipping off the tensioning sleeve 2.

When assembling the shrinkage disc unit, and when the joint 27 is charged with pressurized fluid, the hub 1 is axially pushed onto the tensioning sleeve 2 until the defined pressing between the hollow shaft 4 and the solid shaft 3 is achieved due to the radial widening of the hub 1. The fluid pressure in the joint 27 is then reduced down to atmospheric pressure, such that the outer surface 24 of the tensioning sleeve 2 and the inner surface 25 of the hub 1 come to rest against each other. The radial tensile forces in the hub 1 then fixedly seat the hub 1 in a frictional lock on the tensioning sleeve 2.

Once the hydraulic pressure in the joint 27 has been released, the securing elements 29 are mounted and fastened to the tensioning sleeve 2 using the screws 30. Assembling the shrinkage disc unit is therefore complete. The pressure is then released in the cylindrical bores 26 of the assembling tool, and the assembling tool is removed from the tensioning sleeve 2. The shaft connection is ready to be operated.

The component geometries and the pressures of the pressurized fluid in the joint 27 are preferably selected such that the axial frictional resistance force in the joint 27 after the pressurized fluid has been pressed in is less than the axial force which results over the angle of the conical joint 27 from the radial forces in the hub 1 and tries to drive the hub 1 from the tensioning sleeve 2. In this way, pressing the pressurized fluid into the joint 27 causes the hub 1 to move axially by itself on the outer surface 24, releasing the shrinkage disc unit.

The danger to the assembling staff of the hub 1 slipping off in an uncontrolled manner is prevented by the fact that the shrinkage disc unit cannot be disassembled without attaching the assembling tool to the tensioning sleeve 2. Preferably, once the annular body 7 has been attached to the tensioning sleeve 2, the pistons 9 are brought to rest on the frontal side 1a of the hub 1, and a pressure is built up in the duty cylinders which corresponds to the pressure while assembling the shrinkage disc unit. This prevents the hub 1 from shifting axially on the tensioning sleeve 2 when the pressurized fluid is subsequently pressed into the joint 27. Once the securing elements 29 have been removed, the hub 1 is shifted axially in the direction of the smaller cone diameter in a controlled manner, by slowly releasing the pressurized fluid from the duty cylinders, until the shrinkage disc unit is released, wherein it should be ensured that the pressure of the pressurized fluid in the joint 27 is largely maintained, in order to keep the axial shifting forces low and to prevent "scuffs" between the tensioning sleeve 2 and the hub 1 which can otherwise result due to the friction of the surfaces 24 and 25 when simultaneously moving relative to each other.

Figure 2:
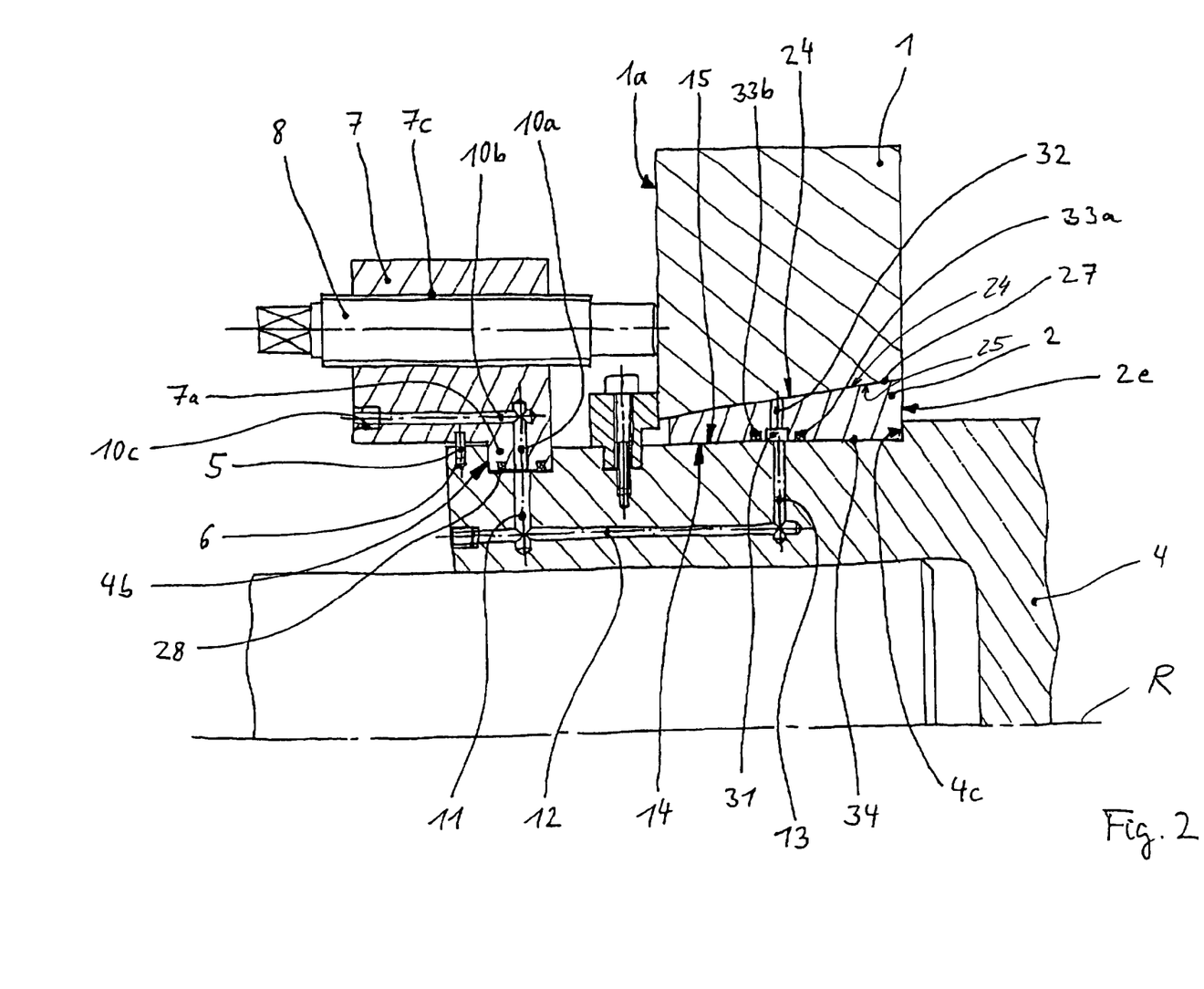
FIG. 2 a shrinkage disc unit according to a second example embodiment.

FIG. 2 shows a second example embodiment of a shrinkage disc unit. The design and function substantially correspond to the first example embodiment. Unlike the first example embodiment, however, the annular body 7 of the assembling tool is fastened to the hollow shaft 4 by means of a positive-lock connection.

The connection is preferably achieved by a radially encircling stay 7a of the annular body 7 engaging in a positive lock with a corresponding groove 4b in the preferably cylindrical outer surface 15 of the hollow shaft 4.

The axial assembling forces are mechanically applied, in the example embodiment by a number of pressure screws 8 which are connected to the annular body 7 in axially orientated threaded bores 7c. The threaded bores 7c are preferably worked directly into the annular body 7. Screwing the pressure screws 8 into the threaded bores 7c applies an axial force to the frontal side 1a of the hub 1 facing them, axially shifting the hub 1 on the tensioning sleeve 2.

The radial bore 6 for receiving the trunnion 5 when the annular body 7 is properly mounted is inserted into the outer surface 15 of the hollow shaft 4. The axial portion of the hollow shaft 4 in question does not comprise any other notches or recesses which could receive the trunnion 5 so allow the assembling tool to be attached at an exact rotational angle. Only the bore 6 achieves this.

The frontal side 2e of the tensioning sleeve 2 preferably abuts a heel 4c of the hollow shaft 4, and the tensioning sleeve 2 is thus axially positioned on the hollow shaft 4.

The bores 11, 12 and 13 for supplying pressurized fluid to the joint 27 are—as opposed to the example embodiment according to FIG. 1—inserted into the hollow shaft 4. The bore 11 is preferably embodied as a blind hole and arranged such that it is orientated from the cylindrical shell surface of the annular groove 4b radially with respect to the centre axis of the hollow shaft 4. The other bore 13 is preferably likewise embodied as a blind hole and is arranged substantially radially from the outer surface 15 of the hollow shaft 4 to the centre axis of the hollow shaft 4. The bore 12, orientated substantially axially with respect to said centre axis, connects the radial bore 11 to the radial bore 13.

The cylindrical inner surface 14 of the tensioning sleeve 2 preferably comprises a radial annular groove 31 which is arranged such that when the tensioning sleeve 2 is mounted, the pressurized fluid can enter the annular groove 31 from the bore 13. A bore 32 leads from the annular groove 31, preferably radially with respect to the conical outer surface 24 of the tensioning sleeve 2, such that the joint 27 can be charged with pressurized fluid. A circumferential sealing element 33a, 33b which seals the outer surface 15 of the hollow shaft 4 off from the inner surface 14 of the tensioning sleeve 2 is preferably arranged next to the annular groove 31 on both sides, in the direction of the longitudinal extension of the tensioning sleeve 2 in each case. In this way, the pressurized fluid is prevented from being able to escape through the joint 27 between the tensioning sleeve 2 and the hollow shaft 4.

The bores 10a and 10b, the pressure port 10c and the sealing element 28 preferably correspond in their arrangement in the annular body 7, their embodiment and their function to the manner of the first example embodiment.

The shrinkage disc unit is assembled and disassembled as in the first example embodiment, except however that the axial forces onto the hub 1 are generated mechanically and not hydraulically.

Figure 3:
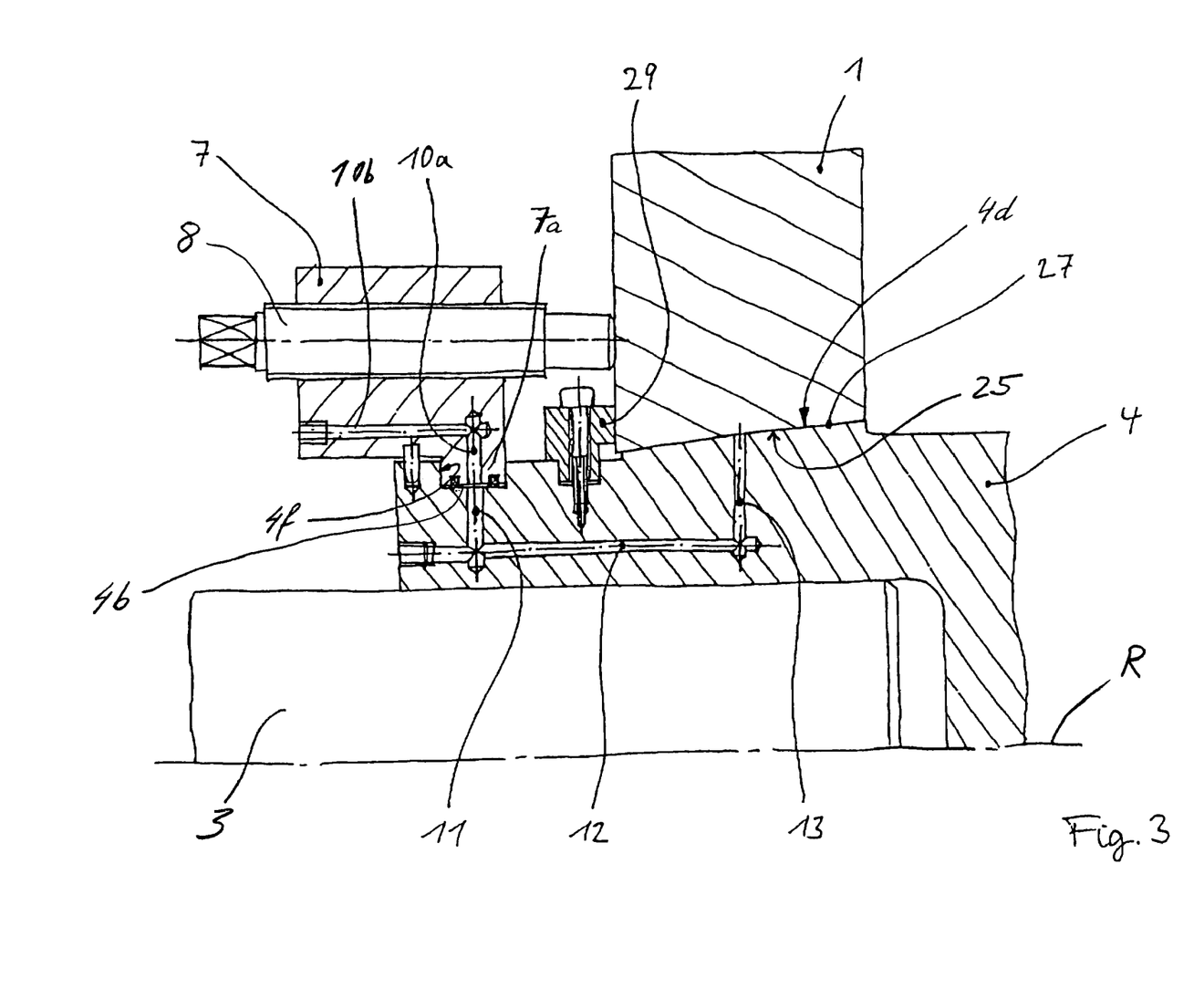
FIG. 3 a shrinkage disc unit according to a third example embodiment.

FIG. 3 shows a third example embodiment of a shrinkage disc unit. The design and function substantially correspond to the second example embodiment. Unlike the second example embodiment, however, the conical outer surface 24 is formed by the hollow shaft 4. The hub 1 is mounted directly on the hollow shaft 4. Here, too, the joint 27 is charged with a pressurized fluid via a system of supply conduits 11, 12 and 13 which are connected to the bore 10a of the annular body 7 when the assembling tool is properly attached. Once completely mounted, the hub 1 is likewise axially secured on the hollow shaft 4 in a positive lock using securing elements 29.

Figure 4:
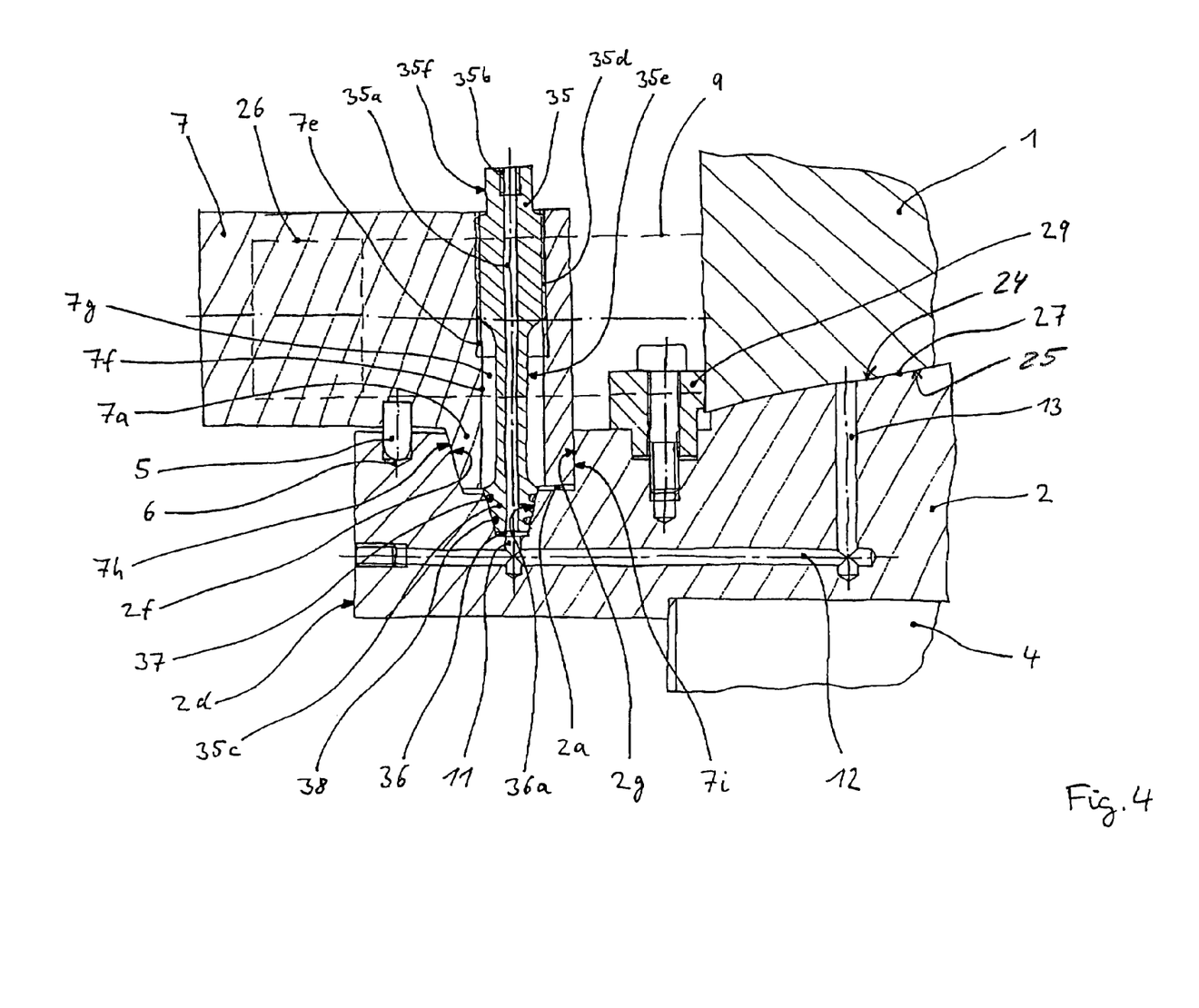
FIG. 4 a shrinkage disc unit according to a fourth example embodiment.

FIG. 4 shows a fourth example embodiment of a shrinkage disc unit. The design and function substantially correspond to the first example embodiment. Unlike the first example embodiment, however, the pressurized fluid for charging the joint 27 is supplied via the pressure port 35b and the longitudinal bore 35a of a screw-in lance 35 of the radial bore 11 in the tensioning sleeve 2. Once the assembling tool has been attached to the tensioning sleeve 2, an outer thread 35d of the screw-in lance 35 is screwed into the inner thread 7e of a substantially radial installation bore 7g of the annular body 7, arranged flush with the bore 11. This brings an externally conical trunnion 35c of the screw-in lance 35 to rest on the preferably congruent wall 36a of a conical bore 36 of the tensioning sleeve 2. The conical bore 36 is arranged such that its centre line runs substantially flush with the centre line of the bore 11, and such that it comprises a connection to the bore 11. Since the trunnion 35c abuts the wall 36a, the system of supply conduits 35a, 11, 12, 13 to the joint 27 is sealed off from the surroundings of the shrinkage disc unit. Two sealing elements 37 and 38 encircling on the trunnion 35c create an additional seal between the trunnion 35c and the wall 36a. The torque for screwing in the screw-in lance 35 is introduced via a number of spanner flats 35f.

The screw-in lance 35 comprises a tapered shaft 35e which allows elastic bending if and when the mounted annular body 7 is deformed by the axial assembling force of the tool. Since the maximum outer diameter of the conical trunnion 35c is smaller than the inner diameter of the portion 7f of the radial installation bore 7g not provided with an inner thread, the trunnion 35c can move freely relative to the annular body 7. These configurations guarantee that the trunnion 35c remains resting on the wall 36a of the bore 36 if and when the annular body 7 is deformed and/or displaced during operations, so that the joint 27 is guaranteed to be reliably charged with pressurized fluid.

The screw-in lance 35 and the installation bore 7g are arranged between two cylindrical bores 26 lying next to each other in the annular body 7. For simplicity, one of the cylindrical bores 26 and one of the pistons 9 are shown by dashed lines in FIG. 4.

The securing elements 29 are formed and arranged on the tensioning sleeve 2 such that they do not protrude into the space occupied by the pistons 9 while the shrinkage disc unit is assembled.

In order to position the screw-in lance 35 as exactly as possible with respect to the conical bore 36 when mounting the annular body 7, they are preferably arranged in approximately the same radial plane as the trunnion 5 and the corresponding bore 6. The bores 6 and 36 should be arranged as near to each other as possible.

The annular groove 2a of the tensioning sleeve 2 preferably comprises an externally conical wall 2f on its side facing the frontal side 2d. The wall 2g facing away from the frontal side 2d is preferably embodied as a plane orientated perpendicular to the centre axis of the tensioning sleeve 2. The stay 7a of the annular body 7, which is directed radially inwards, comprises frontal surfaces 7h, 7i which are congruent with respect to the walls 2f, 2g of the annular groove 2a which they abut full-face when the annular body 7 is properly mounted. This configuration of the annular groove 2a and the stay 7a causes the annular body 7 to be supported by the tensioning sleeve 2, which reduces deformation of the annular body 7 caused by the axial assembling force of the hydraulic cylinders.

Figure 5:
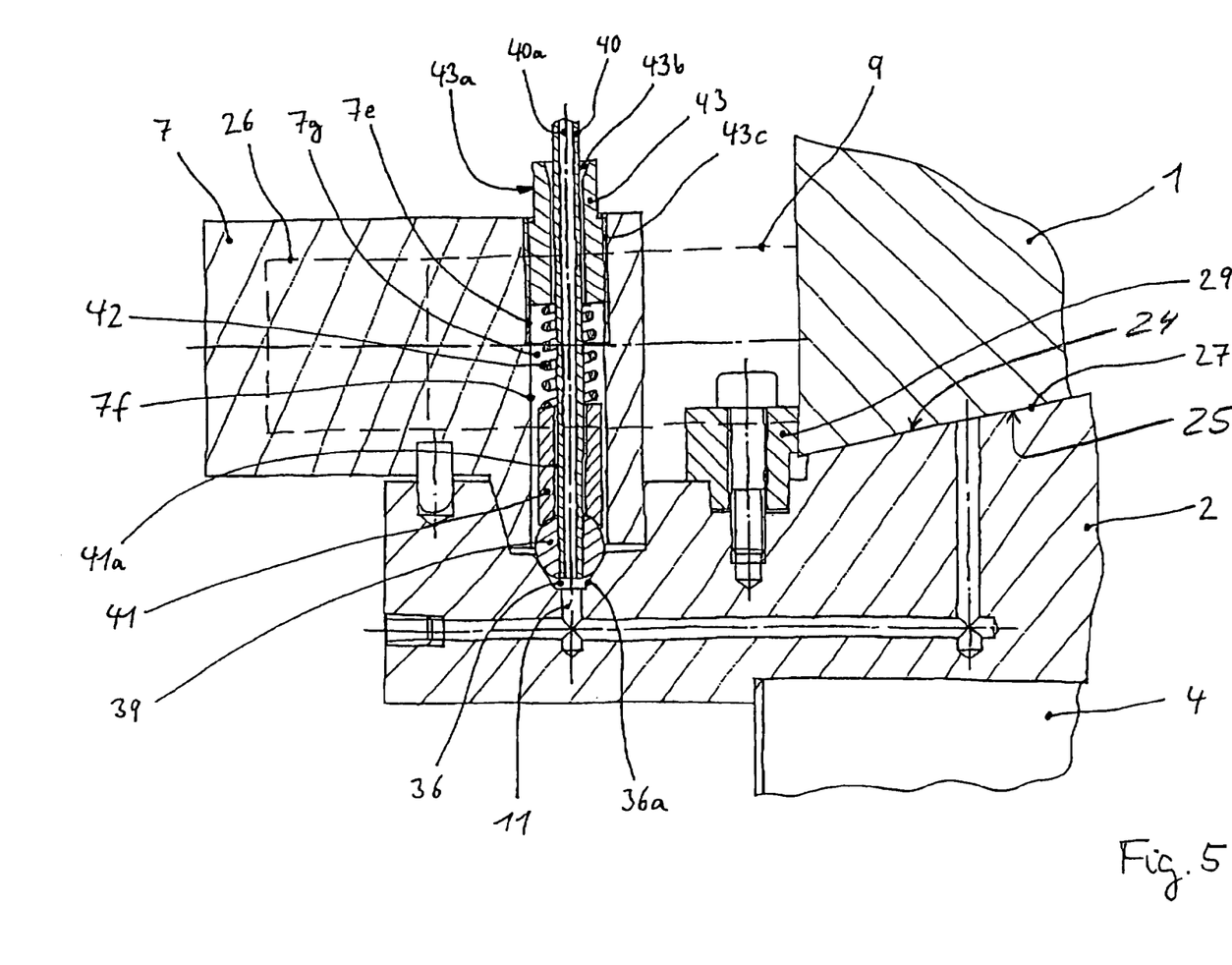
FIG. 5 a shrinkage disc unit according to a fifth example embodiment.

FIG. 5 shows a fifth example embodiment of a shrinkage disc unit. The design and function substantially correspond to the example embodiment shown in FIG. 4. Unlike the example embodiment shown in FIG. 4, the pressurized fluid for charging the joint 27 is supplied via a preferably cylindrical tube 40 of the radial bore 11 in the tensioning sleeve 2.

One end of the tube 40 is pressure-sealed and permanently connected to a preferably substantially spherical body 39 which radially envelopes the tube 40 but leaves its conduit channel 40a free. The spherical body 39 can alternatively be formed as a part of the tube 40 and can for example be formed from the tube 40 by a compression.

Once the annular body 7 has been attached to the tensioning sleeve 2, the spherical body 39 is brought to rest on the wall 36a of the bore 36 in the tensioning sleeve 2, which is again preferably conical. The conical bore 36 is arranged in the tensioning sleeve 2 such that its centre line runs substantially flush with the centre line of the bore 11, and such that it comprises a connection to the bore 11.

Screwing a pressure piece 43, provided with an outer thread 43c, into an inner thread 7e of the annular body 7 exerts a force on the spherical body 39 via a pressure sleeve 41 and preferably via a pressure spring 42, said force pressing the spherical body 39 fixedly onto the wall 36a of the bore 36. In the contact zone of the wall 36a and the spherical body 39, this pressing preferably elastically deforms the contacting partners, achieving a seal between them. By a certain length equalization, the pressure spring 42 largely maintains the force on the spherical body 39 if the annular body 7 moves relative to the tensioning sleeve 2 due to deformation or displacement while the tool is operated.

The outer diameter of the spherical element 39 is smaller than the inner diameter of the portion 7f of the installation bore 7g not provided with a thread. The spherical element 39 and the annular body 7 can therefore move relative to each other without affecting the seal between the spherical body 39 and the conical bore 36.

The pressure piece 43 and the pressure sleeve 41 comprise bores 43b, 41a through which the tube 40 is guided. The tube 40 is also guided through the axial opening of the pressure spring 42.

The torque for screwing the pressure piece 43 into the inner thread 7e is introduced into the pressure piece 43 via a number of spanner flats 43a.

As in the fourth example embodiment, the installation bore 7g and the sub-assembly consisting of the tube 40, the pressure sleeve 41, the pressure spring 42 and the pressure piece 43 are arranged between two cylindrical bores 26 lying next to each other in the annular body 7. For simplicity, one cylindrical bore 26 and one piston 9 are also shown in FIG. 5 by dashed lines. The securing elements 29 are also formed as in the fourth example embodiment.

The conduits for supplying the pressurized fluid to the radial bore 11 as shown in the example embodiments according to FIGS. 4 and 5 can also be combined with the example embodiments according to FIGS. 2 and 3, in which the annular body 7 of the assembling tool is connected to the hollow shaft 4 in a positive lock. The conical bore 36 is then inserted into the hollow shaft 4.

Figure 6:
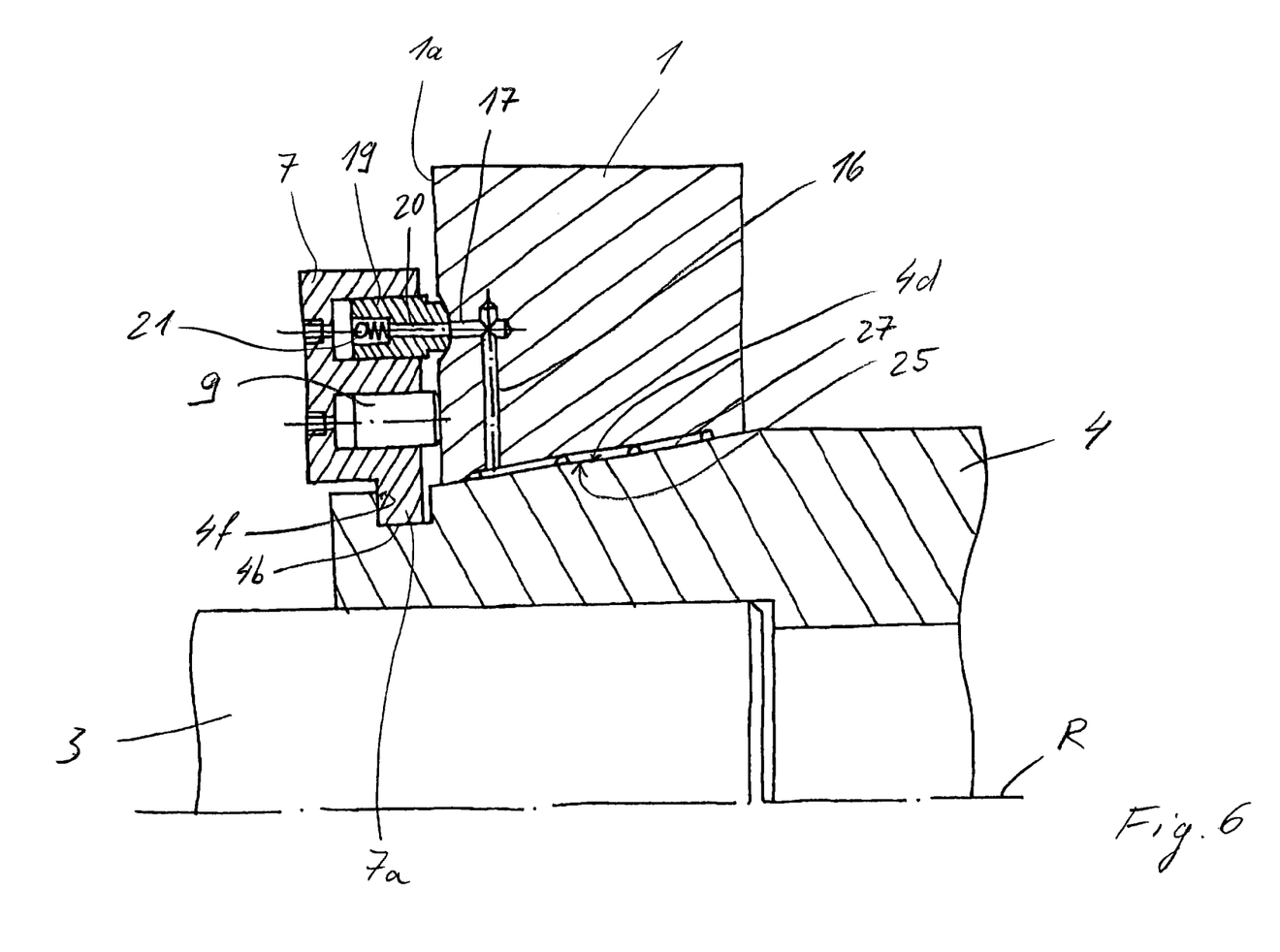
FIG. 6 a shrinkage disc unit according to a sixth example embodiment.

FIG. 6 shows a sixth example embodiment of a shrinkage disc unit in accordance with the invention. In terms of its essential design, the shrinkage disc unit corresponds to the third example embodiment, i.e. the hub 1 is shrunk directly onto the shaft 4. A distribution system formed in the joint 27 for charging the joint 27 with pressure can be seen. The distribution system is formed by a number of circumferential grooves formed in the circumferential inner surface 25, spaced parallel from each other along the rotational axis R. The circumferential grooves are connected to each other by at least one axial groove which is likewise formed in the circumferential inner surface 25.

The sixth example embodiment differs from the first five example embodiments in that the joint 27 is supplied with the pressurized fluid by a fluid channel formed in the hub 1. The fluid channel comprises a radial portion 16 and an axial portion 17 which is connected to the portion 16 and ports to the surroundings on the frontal side 1a of the hub 1 axially opposite the tool, such that when the port is not sealed off, there is free pressure equalization between the joint 27 and the surroundings. The two channel portions 16 and 17 are again formed as straight bores and directly intersect each other.

The fixing structure 7 of the tool again supports a number of pistons 9 arranged in even distribution around the rotational axis R, such that they can be moved axially against the frontal side 1a. A single annular piston can be provided instead of a number of individual pistons 9—as incidentally also in the other example embodiments. The pistons 9 correspond in their function and construction to the pistons 9 of the other example embodiments.

The fixing structure 7 supports another piston 19, likewise such that it can be moved against the frontal side 1a. The piston 19 acts as a sealing piston which separates the fluid channel 16, 17 from the surroundings, i.e. seals it off from the surroundings, when it presses against the frontal side 1a. The sealing piston 19 is arranged in the fixing structure 7 such that when the tool—i.e. its fixing structure 7—is properly mounted, the sealing piston 19 lies opposite the port of the fluid channel 16, 17, such that it can be moved against the port region. The sealing piston 19 forms a fluid channel 20 through which the pressurized fluid is guided into the fluid channel 16, 17 and thus into the joint 27, in order facilitate assembling and/or disassembling the shrinkage disc unit. A valve 21—in the example embodiment, a pressure control valve—is arranged in the fluid channel 20 of the sealing piston 19. The valve 21 seals the fluid channel 20 up until a predetermined supply pressure is reached, and releases it once the predetermined supply pressure has been reached or exceeded.

As in the other example embodiments, the pistons 9 are charged with pressure for assembling and/or disassembling the shrinkage disc unit, such that they are moved against the hub 1 and either push it onto the shrinkage surface 4d of the shaft 4 for the purpose of assembling or axially secure the hub 1 on the shaft 4 for the purpose of disassembling. At the same time as the pistons 9 are charged with pressure, the sealing piston 19 is also charged with the pressurized fluid in the direction of the hub 1. The cylinder spaces of the piston or pistons 9 and of the sealing piston 19 can each be charged with the pressurized fluid and each charged with the same pressures. Up until the predetermined supply pressure in the cylinder space of the sealing piston 19 is reached, the valve 21 seals the fluid channel 20, such that pressing pressurized fluid into the cylinder space of the sealing piston 19 initially results in the sealing piston 19 being drawn out. When the frontal side of the sealing piston 19 abuts the frontal side 1a of the hub 1, the fluid channel 17 is sealed off from the surroundings and thus sealed-off against the pressurized fluid escaping. Further pressing the pressurized fluid in, and the associated increase in pressure in the cylinder space of the sealing piston 19, opens the valve 21, such that the pressurized fluid enters the joint 27 via the fluid channel 20 of the sealing piston 19 and the fluid channel 16, 17 of the hub 1, and a fluid pressure is built up in the joint 27. The sealing piston 19 moves together with the piston or pistons 9 and therefore remains in a sealing, pressing contact with the frontal side 1a of the hub during assembling and/or disassembling.

Figure 7:
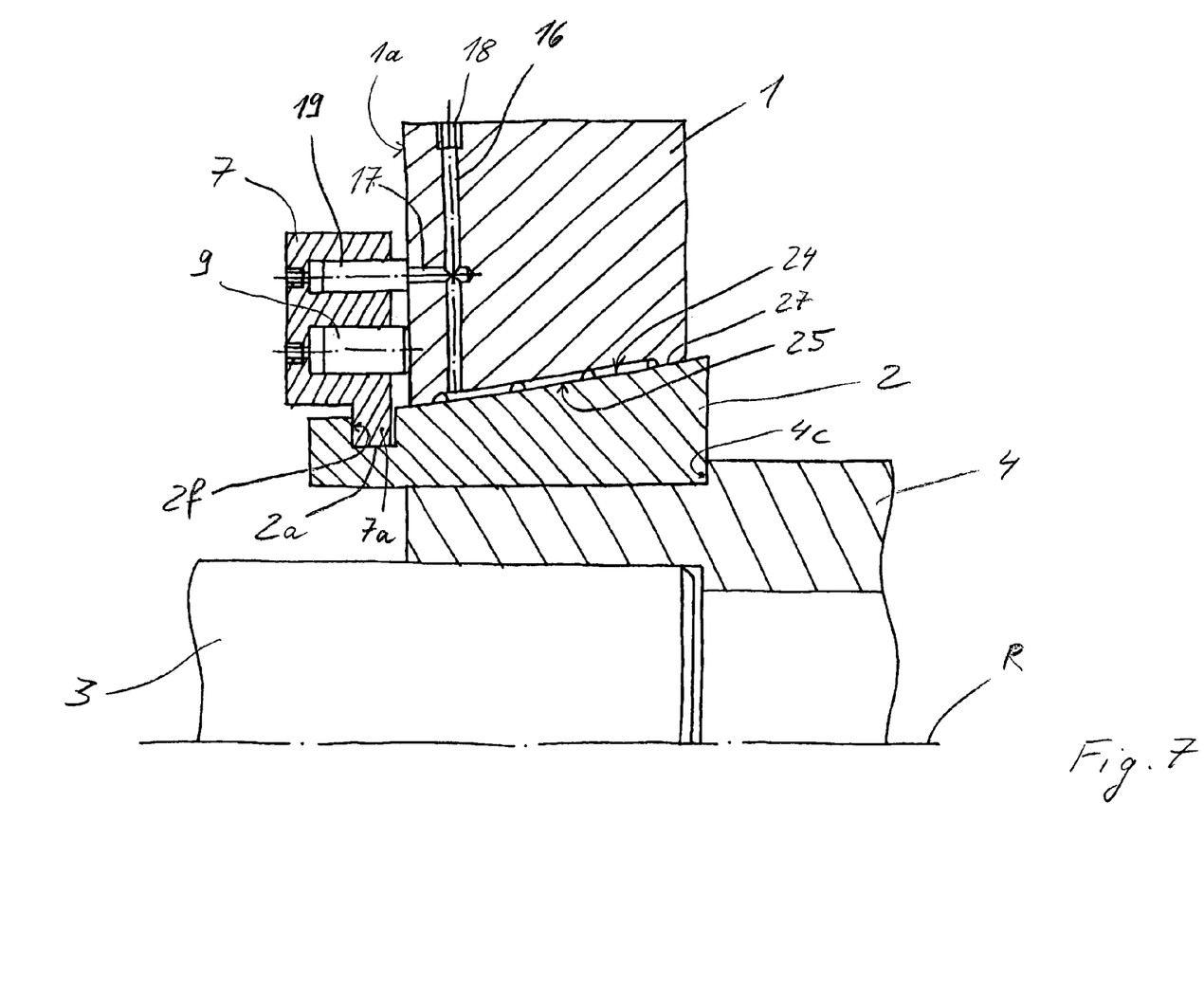
FIG. 7 a shrinkage disc unit according to a seventh example embodiment.

FIG. 7 shows a shrinkage disc unit in accordance with the invention, according to a seventh example embodiment, comprising a tensioning sleeve 2, the mechanical design of which therefore corresponds to the first, second, fourth and fifth example embodiments. As in the sixth example embodiment above, the joint 27 can be charged with the pressurized fluid via the hub 1.

Unlike the example embodiments described above, however, the shrinkage disc unit is provided with a port for the pressurized fluid, such that the tool is relieved of the function of supplying the pressurized fluid. During assembling and/or disassembling, however, it is given the function of sealing off the fluid channel of the hub 1 from the surroundings and therefore enabling pressure to be built up in the joint 27.

The fluid channel 16, 17 of the hub 1 comprises a channel portion 16 which extends from the joint 27 up to a frontal side of the hub 1—in the example embodiment, up to the frontal side radially opposite the joint 27. An end portion of the channel portion 16 forms a port 18 for supplying the pressurized fluid. While the shrinkage disc unit is operated, the port 18 is sealed by means of a sealing element. For assembling and/or disassembling, a pressurized fluid supply is connected to the port 18 and the joint 27 is charged with pressure via the channel portion 16. The channel portion 17 branching off from the channel portion 16 ports to the surroundings on the frontal side 1a of the hub 1. When the port is open, a constant pressure equalization between the surroundings and the joint 27 is thus ensured.

For assembling and/or disassembling, the tool is positioned on the shrinkage disc unit at an exact rotational angle—as described above in the other example embodiments—and axially supported by the collar 2f of the groove 2a. Once the tool has been properly fixed in this way, the pistons 9 are moved against the hub 1 in order to either push the hub 1 on for assembling or to secure it for disassembling while the joint 27 is charged with the pressurized fluid. As in the sixth example embodiment above, the fixing structure 7 supports a sealing piston 19 such that it can be moved against the frontal-side port of the fluid channel 17 in order to seal off the fluid channel 17 and therefore the pressure system of the shrinkage disc unit, for assembling and/or disassembling. Unlike the sixth example embodiment, however, the sealing piston 19 serves only to seal off the fluid channel 17 and does not also simultaneously serve as a pressurized fluid supply.

Figure 8:
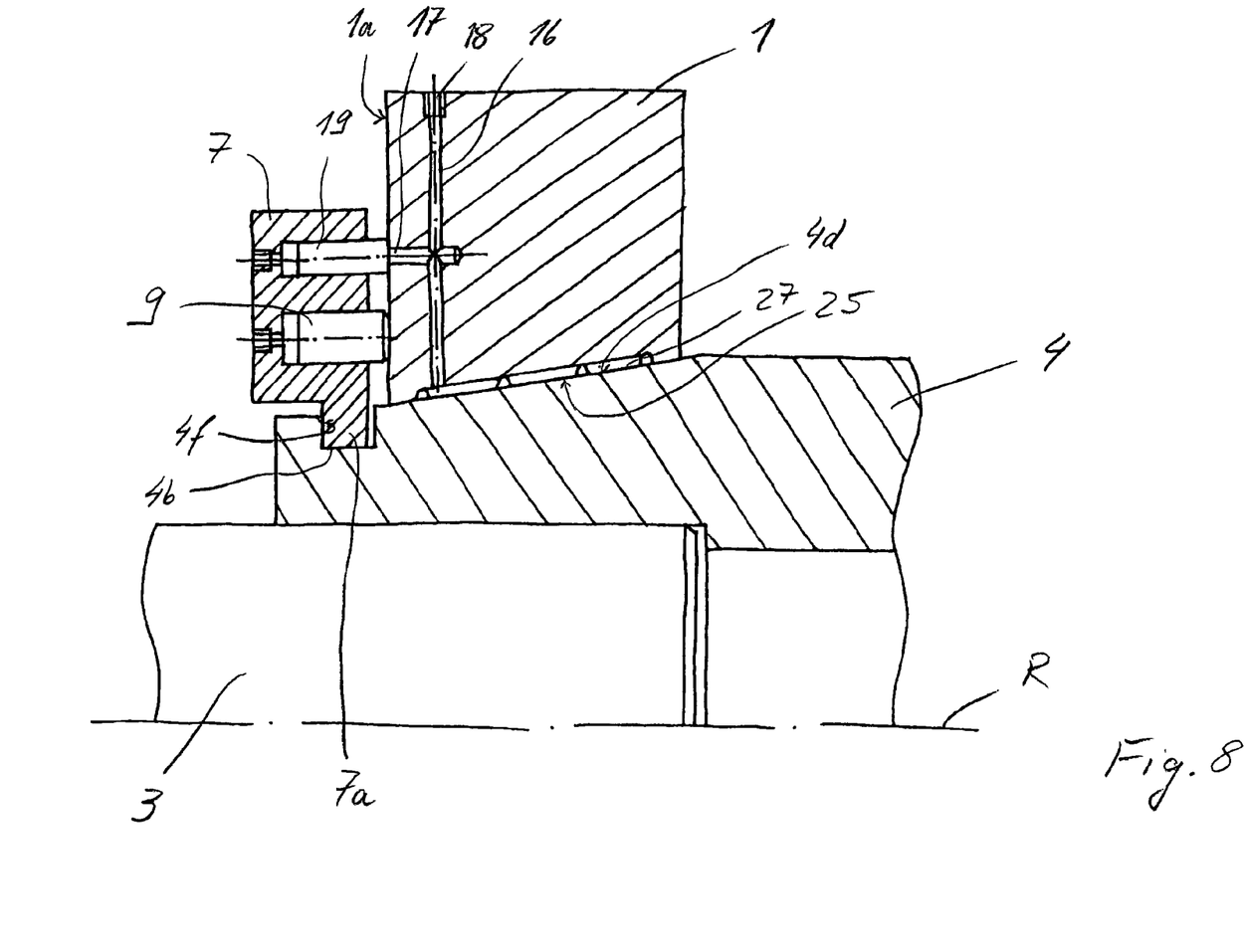
FIG. 8 a shrinkage disc unit according to an eighth example embodiment.

FIG. 8 shows an eighth example embodiment of a shrinkage disc unit in accordance with the invention, which differs from the seventh example embodiment only in that the hub 1 is shrunk directly onto the shaft 4—as in the third and sixth example embodiments above. The shrinkage disc unit and the tool otherwise correspond to those of the seventh example embodiment.

With respect to the sixth, seventh and eighth example embodiments, it should also be noted that the functions of pushing on and/or securing the hub 1 on the one hand and the function of solely sealing off or of sealing off and supplying the pressurized fluid on the other hand are not necessarily performed by two systems of pistons, but can be performed by a single system of pistons or in principle by a single piston, as long as it is ensured that the function of supplying the pressurized fluid or alternatively the function of sealing off can only be fulfilled when the tool is properly fixed to the shrinkage disc unit.

In the foregoing description, preferred embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claim when interpreted in accordance with the breadth they are fairly, legally, and equitably entitled.

REFERENCE SIGNS

1: hub
1a: frontal side
2: tensioning sleeve
2a: annular groove
2b: heel
2c: frontal side
2d: frontal side
2e: frontal side
2f: collar
2g: wall
2h: outer surface
2i: radial groove
3: solid shaft
4: hollow shaft
4a: frontal side
4b: annular groove
4c: heel
4d: circumferential outer surface
4f: collar
5: trunnion/protruding portion
6: bore/retracted portion
7: annular body
7a: stay
7b: frontal side
7c: threaded bore
7d: inner surface
7e: inner thread
7f: portion not provided with a thread
7g: installation bore
7h: frontal side
7i: frontal side
8: pressure screw
9: piston(s)
10a: bore
10b: bore
10c: pressure port
11: radial bore
12: axial bore
13: radial bore
14: inner surface
15: outer surface
16: fluid channel
17: fluid channel
18: port
19: sealing means, sealing piston
20: fluid channel
21: valve
22: inner surface
23: outer surface
24: circumferential outer surface
25: circumferential inner surface
26: cylindrical bore, bore
26a: pressure port
27: joint
28: sealing element
29: securing element
30: screw
31: annular channel 32: bore
33a: sealing element
33b: sealing element
34: joint
35: screw-in lance
35a: longitudinal bore
35b: pressure port
35c: conical trunnion
35d: outer thread
35e: tapered shaft
35f: spanner flat
36: conical bore
36a: wall
37: sealing element
38: sealing element
39: spherical element
40: tube
40a: conduit channel
41: pressure sleeve
41a: bore
42: pressure spring
43: pressure piece
44: spanner flats
45: bore
43c: outer thread
R: rotational axis

The invention claimed is:

1. A shrinkage disc unit assembly, comprising:
 a) a rotational body comprising a circumferential outer surface;
 b) a hub surrounding the rotational body and comprising a circumferential inner surface which together with the circumferential outer surface forms an inclined joint between the rotational body and the hub, wherein the hub can be shrunk onto the rotational body at the joint;
 c) a fluid channel leading through the rotational body or the hub, for charging the joint with a pressurized fluid;
 d) and a fixing assembly which is formed by one of the rotational body and the hub, alone or in combination with the other, and by means of which a tool can be axially supported either on the rotational body or the hub and fixed only in a predetermined rotational angular position on the rotational body and/or the hub, for assembling and/or disassembling the hub
 e) wherein the rotational body and/or the hub is or are configured such that it is only possible to press a pressurized fluid into the joint when the tool is mounted at the predetermined rotational angular position on the rotational body and/or the hub; and
 f) wherein said tool comprises
 a) a fixing structure for positioning the tool on the rotational body or the hub at the predetermined rotational angle position and axially supporting the tool on one of the rotational body and the hub;
 b) a pressure element or tensile element, supported by the fixing structure such that it can be moved, by means of which, when a fixing part is axially supported on one of the rotational body and the hub, the other of the rotational body and the hub can be charged with an axial force; and
 c1) a fluid channel formed in the tool and, when the tool is fixed, connected to the fluid channel of the shrinkage disc unit such that the joint can be charged with the pressurized fluid through the fluid channel of the tool, or
 c2) a sealing mechanism formed by the tool, for sealing off the fluid channel of the shrinkage disc unit;
 wherein the fixing structure is an annular body and bears a number of sub-assemblies which apply axial forces between the hub and rotational body for assembly thereof, the sub-assemblies for applying the axial forces are embodied as hydraulic cylinders which consist substantially of cylindrical bores comprising a pressure port and of pistons, and wherein the fixing structure is embodied in one or more parts.

2. The shrinkage disc unit assembly according to claim 1, wherein the joint is conical at least in segments.

3. The shrinkage disc unit assembly according to claim 1, wherein a supporting collar is formed on either the rotational body or the hub and supports the tool in a positive lock.

4. The shrinkage disc unit assembly according to claim 1, wherein a positioning element is formed as a cavity or protrusion on either the rotational body or the hub and is configured to engage a positioning element of the tool, formed as a protrusion or cavity, in order to position the tool at the predetermined rotational angular position.

5. The shrinkage disc unit assembly according to claim 4, wherein the positioning element is arranged near to a port of the fluid channel of the shrinkage disc unit.

6. The shrinkage disc unit assembly according to claim 5, wherein the positioning element is arranged in a rotational angular position relative to the rotational axis which is 30° at most away from the port of the fluid channel.

7. The shrinkage disc unit assembly according to claim 1, wherein the tool comprises one or more protruding or retracted portions which engage with a corresponding number of portions of one of the rotational body and the hub, substantially congruent with respect to the portion or portions of the tool, when fastening the tool, wherein the configuration and arrangement of the portions only allows the tool to be fastened such that the tool is at the predetermined rotational angular position.

8. The shrinkage disc unit assembly according to claim 1, wherein the tool is forced to be properly fastened to one of the rotational body and the hub by the configuration of the tool and said one of the rotational body and the hub.

9. The shrinkage disc unit assembly according to claim 1, wherein the tool can be or is connected to one of the rotational body and the hub in a non-positive lock via a number of tensile screws.

10. The shrinkage disc unit assembly according to claim 1, wherein the tool is connected to one of the rotational body and the hub in a positive lock via at least one groove at least partially encircling an outer surface of said one of the rotational body and the hub and at least one portion of the tool engaging the at least one groove in a positive lock.

11. The shrinkage disc unit assembly according to claim 1, wherein the tool is connected to said one of the rotational body and the hub in a frictional lock by surface contact.

12. The shrinkage disc unit assembly according to claim 1, wherein:
 a) the joint is charged with pressurized fluid via a supply conduit which is integrated into one of the rotational body and the hub and via a supply conduit which is integrated into the tool;
 b) and wherein there is a connection between the supply conduits when the tool is properly fastened to said one of the rotational body and the hub.

13. The shrinkage disc unit assembly according to claim 12, wherein:
 a) the rotational body includes a shaft and a tensioning sleeve and the joint is charged with pressurized fluid via a supply conduit which is integrated into the shaft, via a supply conduit which is integrated into the tensioning sleeve and connected to the supply conduit of the shaft, and via a supply conduit which is integrated into the tool;

b) and wherein there is a connection between the supply conduits when the tool is properly fastened to the shaft.

14. The shrinkage disc unit assembly according to claim 1, wherein the joint is charged with pressurized fluid via a supply conduit which is integrated in said one of the rotational body and the hub and via a supply conduit formed by a component of the tool, wherein the component is connected indirectly or directly to the fixing structure of the tool.

15. The shrinkage disc unit assembly according to claim 14, wherein the supply conduit formed in the tool is formed by the longitudinal bore of a screw-in lance.

16. The shrinkage disc unit assembly according to claim 15, wherein the end of the screw-in lance facing the rotational axis comprises a conical trunnion which, once the tool has been attached to one of the rotational body and the hub, comes to rest on the congruent wall of a bore when the screw-in lance is screwed into the installation bore.

17. The shrinkage disc unit assembly according to claim 16, wherein the bore of said one of the rotational body and the hub is inserted substantially flush with the radial bore, and wherein there is a connection to the radial bore.

18. The shrinkage disc unit assembly according to claim 16, wherein the conical trunnion coming to rest on the wall seals off the screw-in lance from said one of the rotational body and the hub, preventing pressurized fluid from escaping into the surroundings of the shrinkage disc unit.

19. The shrinkage disc unit assembly according to claim 16, wherein the bore is a conical bore.

20. The shrinkage disc unit assembly according to claim 15, wherein the screw-in lance is screwed via an outer thread into an inner thread of an installation bore of the fixing structure.

21. The shrinkage disc unit assembly according to claim 20, wherein the longitudinal extension of the installation bore is substantially radial with respect to the rotational axis.

22. The shrinkage disc unit assembly according to claim 14, wherein the supply conduit inserted in the component is arranged substantially radially with respect to the rotational axis.

23. The shrinkage disc unit assembly according to claim 1, wherein a pressurized fluid supply conduit formed in the tool is formed by a conduit channel of a tube.

24. The shrinkage disc unit assembly according to claim 23, wherein one end of the tube is connected, permanently and pressure-sealed, to an element.

25. The shrinkage disc unit assembly according to claim 24, wherein the other end of the tube is indirectly or directly connectable to a pressure port.

26. The shrinkage disc unit assembly according to claim 24, wherein the element surrounds the end of the tube, wherein the opening of the conduit channel is not blocked.

27. The shrinkage disc unit assembly according to claim 24, wherein once the tool has been attached to said one of the rotational body and the hub, the element comes to rest on the wall of a bore, when a pressure piece provided with an outer thread is screwed into the inner thread of the installation bore.

28. The shrinkage disc unit assembly according to claim 27, wherein the bore is a conical bore.

29. The shrinkage disc unit assembly according to claim 24, wherein the element coming to rest on the wall seals off the tube from said one of the rotational body and the hub, preventing pressurized fluid from escaping into the surroundings of the shrinkage disc unit.

30. The shrinkage disc unit assembly according to claim 24, wherein the pressure piece is connected indirectly or directly to the element.

31. The shrinkage disc unit assembly according to claim 24, wherein the pressure piece is connected to the element via an axial spring element and via a pressure sleeve.

32. The shrinkage disc unit assembly according to claim 31, wherein the tube is guided through a bore of the pressure sleeve.

33. The shrinkage disc unit assembly according to claim 24, wherein the element is substantially spherical.

34. The shrinkage disc unit assembly according to claim 23, wherein the tube is indirectly or directly connectable to the fixing structure of the tool.

35. The shrinkage disc unit assembly according to claim 34, wherein the longitudinal extension of the tube runs along the centre axis of an installation bore.

36. The shrinkage disc unit assembly according to claim 35, wherein the installation bore is arranged substantially radially with respect to the centre axis of said one of the rotational body and the hub.

37. The shrinkage disc unit assembly according to claim 35, wherein the installation bore is arranged substantially radially with respect to the centre axis of the rotational body.

38. The shrinkage disc unit assembly according to claim 23, wherein the bore is inserted, substantially flush with the radial bore, into said one of the rotational body and the hub, wherein there is a connection to the radial bore.

39. The shrinkage disc unit assembly according to claim 38, wherein the bore is a conical bore.

40. The shrinkage disc unit assembly according to claim 39, wherein the bore is inserted into the rotational body.

41. The shrinkage disc unit assembly according to claim 1, wherein when the shrinkage disc unit is assembled, the hub is secured against axially shifting along the centre axis of the rotational body in a positive lock on the rotational body via a number of securing elements, wherein the securing elements are secured in their position on one of the rotational body and the hub in a non-positive lock or/and a positive lock.

42. The shrinkage disc unit assembly according to claim 1, wherein the rotational body includes a shaft and a tensioning sleeve and the tensioning sleeve is prevented from axially shifting along the centre axis of the shaft by the configuration of the tensioning sleeve and the shaft.

43. The shrinkage disc unit assembly according to claim 42, wherein the tensioning sleeve has a cylindrical inner surface or a shaft.

44. The shrinkage disc unit assembly according to claim 1, wherein the circumferential outer surface and the circumferential inner surface comprise a number of congruent portions.

45. The shrinkage disc unit assembly according to claim 1, wherein the joint is circumferentially conical.

46. The shrinkage disc unit assembly according to claim 1, wherein at least one division between fixing structure parts is embodied radially with respect to the longitudinal axis of the fixing structure.

47. The shrinkage disc unit assembly according to claim 1, wherein the cylindrical bores are worked directly into the fixing structure.

* * * * *